Patented Jan. 6, 1931

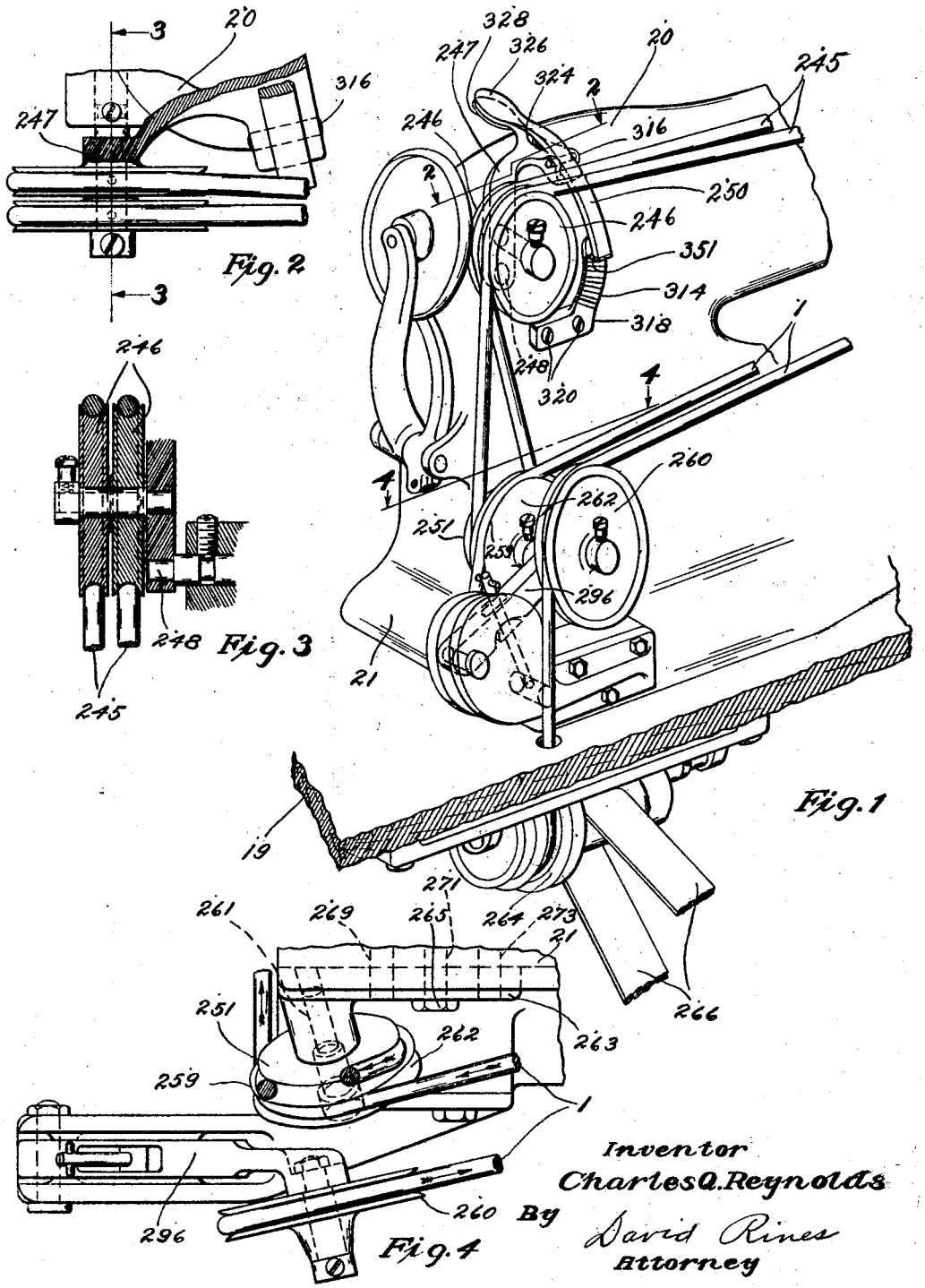

1,787,704

UNITED STATES PATENT OFFICE

CHARLES QUIMBY REYNOLDS, OF ST. LOUIS, MISSOURI, ASSIGNOR, BY MESNE ASSIGNMENTS, TO UNITED SHOE MACHINERY CORPORATION, OF PATERSON, NEW JERSEY, A CORPORATION OF NEW JERSEY

SKIVING MACHINE

Application filed November 6, 1923. Serial No. 673,122.

The nature and the object of the invention will be readily understood from the following description, taken in connection with the accompanying drawings, in which Fig. 1 is a rear perspective view illustrating the invention in its preferred form; Fig. 2 is a plan view of a detail, partly in section upon the line 2—2 of Fig. 1, looking in the direction of the arrows; Fig. 3 is a section taken upon the line 3—3 of Fig. 2, looking in the direction of the arrows; and Fig. 4 is a section taken upon the line 4—4 of Fig. 1, looking in the direction of the arrows.

Skiving machines are usually provided with a skiving knife for cutting a scarf in the margin of the stock, a grinder therefor, and feed mechanism for advancing the stock to the knife. These are not illustrated in the accompanying drawings, because unnecessary to an understanding of the present invention. It is sufficient to illustrate the frame 20 of the machine, provided with a base portion 21 that is bolted or otherwise secured to a bench or the like 19. The construction of machines of this character is well understood by persons skilled in the art, but reference may be had for a fuller understanding of the illustrative machine to a patent to Andrew R. Ridderstrom, No. 1,721,053, granted July 16, 1929. As is therein fully disclosed, the knife is directly driven by a belt 1 that passes over idler pulleys 260 and 262, in the direction of the arrows, and over a cone pulley 264 that may be driven from any suitable source of power by a belt 266. The pulley 260 is mounted upon a spring-pressed arm 296, as is described more fully in the above-mentioned patent, and acts as a belt tightener. The pulley 262 is mounted upon a bearing rod 261 that is carried upon a bracket 263. The bracket 263 may be adjustably clamped to the base portion 21 of the frame of the machine by a bolt or screw 265 that is adapted to enter any one of three openings 269, 271 and 273. The pulley 262 may thus be adjustably positioned over the small, the medium-sized and the large portion, respectively, of the cone pulley 264. The pulley 262 may thus be driven from the cone pulley 264 at any of three speeds.

As the cone pulley 264 is of diameter greater than the distance between the pulleys 260 and 262, and as the belt leads almost directly up from the cone pulley 264 substantially tangentially to the pulley 260 and in substantially the plane of the pulley 260, it is obvious that the belt 1 traverses down from the pulley 262 to the cone pulley 264 at a substantial angle. The belt 1 therefore veers sharply, when leaving the pulley 262, with the parts arranged as shown in the drawings of the above-identified patent. This veering effect causes the belt to cut sharply against the edge 259 of the pulley 262, and introduces an abnormal strain in the belt that shortens its life. According to the present invention, however, the pulley 262 is mounted upon its bearing rod 261 at an angle such that the belt shall arrive to the pulley 262, and shall leave it, in substantially the plane of the pulley 262. The above-described veering effect is thus obviated, and the life of the belt is considerably increased.

A pulley 251, that is fast to the pulley 262, serves as a source of driving power for the grinder (not shown). The grinder is driven by a belt 245 that passes from the pulley 251, over idler pulleys 246. In order that the belt 245 may be tightened or loosened, as desired, the idler pulleys 246 are made adjustable. To this end, they are rotatably mounted upon a bracket 247 that is pivoted to the frame 20 of the machine at 248. In order that the bracket 247 may be held in pivotally adjusted position, it is provided with a catch 250 having a tooth 351 adapted to engage teeth 314. The teeth 314 are shown carried upon a bracket 318 that is secured to the frame 20 of the machine in any preferred manner, as by means of screws 320. The catch 250 is pivoted to the bracket 247 at 316, and its tooth 351 is held in engagement with the teeth 314 by a coil spring 324. The spring 324 is shown mounted in position between the bracket 247 and a handle 326 of the catch 250. The bracket 247 is similarly provided with a handle 328. To tighten the belt 245, the handle 328 is pulled upward, as shown in Fig. 1, causing the bracket 247 to pivot about its pivotal point 248, and the tooth 351 to ratchet over the teeth 314. To release the tension in the belt 245, the palm of the hand is brought down upon the handle 326, thus overpowering the spring 324 and causing the tooth 351 to disengage the teeth 314. The bracket 247 will thereupon fall, by gravity, about its pivotal point 248, carrying with it the pulleys 246, and rendering the belt-tightener ineffective.

A very much simpler belt-tightener for the belt 245 is thus provided than in the above-identified patent. To tighten the belt 245, and thereby set the grinder (not shown) into operation, all that is necessary is to pull upward on the handle 328; and to loosen the belt, all that is required is to strike or push upon the handle 326.

The description of many portions of the machine an understanding of which is not essential to an understanding of the present invention has purposely been omitted, and many parts of the machine have purposely not been illustrated, in order not to distract the attention from the features of essential novelty. Fuller explanation of such portions of the machine will be found in the patent referred to above. It will be clear that the features of novelty may be embodied in other machines, and in machines of other types, and that modifications may be made therein, by persons skilled in the art, without departing from the spirit and scope of the invention, as defined in the appended claims.

What is claimed is:—

1. In a skiving machine having a skiving knife, two pulleys, a third pulley the diameter of which is greater than the distance between the two pulleys, and a belt for driving the knife passing from one of the two pulleys to the third pulley and from the third pulley to the other of the two pulleys, the belt leading from the third pulley substantially tangentially to the said other pulley and in substantially the plane of the said other pulley, and the belt traveling towards and from the said one pulley in substantially a plane, the said plane being the plane of the said one pulley, the third pulley being disposed in a different plane.

2. In a skiving machine having a knife and a grinder therefor, a belt for driving the grinder, a belt tightener for the belt, and common means adapted to be pulled to render the belt-tightener effective, and to be pushed to render the belt-tightener ineffective.

3. In a skiving machine having a skiving knife, two pulleys, a cone pulley the diameter of which is greater than the distance between the two pulleys and having a plurality of different-size portions, a belt for driving the knife passing from one of the two pulleys to the cone pulley and from the cone pulley to the other of the two pulleys, the belt leading from the cone pulley substantially tangentially to the said other pulley and substantially in the plane of the said other pulley, and the belt traveling towards and from the said one pulley in substantially the plane of the said one pulley, and means for adjusting the said one pulley so as to adapt it to cooperate with the different-size portions of the cone pulley without disturbing the position of the belt relative to the pulleys.

4. In a skiving machine, a belt tightener for the belt that drives the grinder of the skiving machine, a frame having a pivot, a pulley mounted upon the frame, a belt mounted over the pulley, a bracket pivoted to the frame about the pivot having an idler pulley over which the belt is mounted, the bracket having a handle to one side of the pivot whereby to adjust the idler pulley about the pivot by an upward pulling movement upon the handle, thereby causing the idler pulley to pull upward upon the belt and thus serve as a belt tightener, a catch connected with the bracket having a tooth that is adapted to move upward with the handle, a toothed ratchet having vertically disposed teeth adapted to be engaged by the tooth during its upward movement to lock the idler pulley in adjusted position, the catch having a handle disposed adjacent to the first-named handle, and means disposed between the handles yieldingly maintaining the handles separated and the tooth in engagement with the toothed ratchet, the catch handle being adapted to be actuated in opposition to the action of the yielding maintaining means and towards the first-named handle to release the tooth from engagement with the toothed ratchet, whereupon the tension of the belt acting upon the idler pulley will cause the bracket to fall downward pivotally about the pivot, rendering the pulley ineffective as a belt tightener.

5. In a skiving machine having a skiving knife and a grinder therefor, means for driving the knife, a pulley, an idler pulley, a belt for driving the grinder mounted over the pulleys, the idler pulley being adjustable, whereby it may serve as a belt tightener, a catch pivoted to the idler pulley, means adapted to be engaged by the catch to lock the idler pulley in adjusted position, and means yieldingly maintaining the catch engaged with the locking means, the catch having a handle adapted to be actuated in opposition to the action of the yielding maintaining means to release the catch from engagement with the locking means.

In testimony whereof, I have hereunto subscribed my name this 22nd day of October, 1923.

CHARLES QUIMBY REYNOLDS.